Sept. 10, 1968    J. M. HORN ET AL    3,400,907
BUTTERFLY VALVE WITH MOVABLE PIVOT AXIS
Filed June 20, 1967
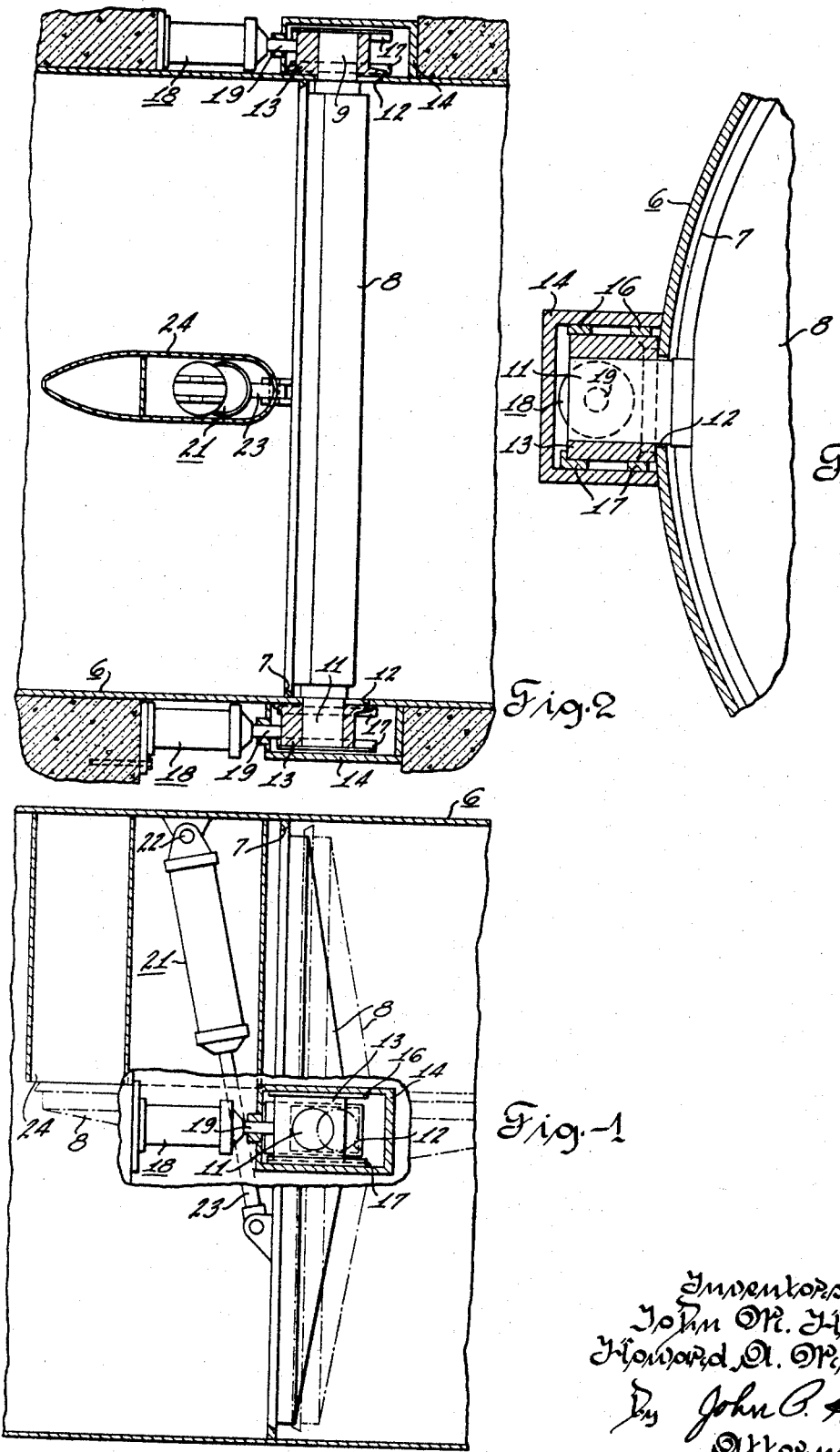
Inventors
John M. Horn
Howard A. Mayo, Jr.
By John P. Hines
Attorney

United States Patent Office 3,400,907
Patented Sept. 10, 1968

3,400,907
BUTTERFLY VALVE WITH MOVABLE PIVOT AXIS
John M. Horn and Howard A. Mayo, Jr., York, Pa., assignors to Allis Chalmers Manufacturing Company, Milwaukee, Wis.
Filed June 20, 1967, Ser. No. 647,383
4 Claims. (Cl. 251—31)

ABSTRACT OF THE DISCLOSURE

A butterfly valve having a disk with an offset pivot axis to permit uninterrupted 360° seating, including power means to move the pivot axis relative to the valve seat to permit rotation of the disk without interfering with the valve seat.

---

This invention pertains in general to butterfly valves and more particularly to that type of valve which has 360° seating. In valves of this type, the rotational axis of the valve disk is laterally offset from the valve seat. With this arrangement the valve shaft does not pass through the seat thereby averting a difficult sealing problem. Although this arrangement does permit uninterrupted 360° seating, it does present a problem of rotating the valve disk so that it will not interfere with the valve seat.

It is therefore a general object of this invention to provide an uninterrupted 360° seating butterfly valve with novel means to permit rotation of the valve disk without interfering with the valve seat.

A further object of this invention is to provide a butterfly valve of the hereinbefore described type with power means for laterally moving the pivot axis of the valve disk to permit rotation of the disk without interfering with the valve seat.

These and other objects of the subject invention will become more fully apparent as the following description is read in light of the attached drawing wherein:

FIG. 1 is a side elevation showing a butterfly valve constructed in accordance with this invention;

FIG. 2 is a plan view of FIG. 1; and

FIG. 3 is a partial end view showing the means for laterally adjusting the valve disk.

Referring to the attached drawing, the butterfly valve is shown herein for purposes of illustration positioned within a valve housing generally designated 6. A valve seat 7 is provided on the inner peripheral surface of the housing 6. This seat is an uninterrupted 360° seat of any well known construction and composition. As herein shown, the seat has a conical surface.

A valve disk 8 is positioned within the housing. This disk may be provided with a through shaft or two shaft trunnions 9 and 11 as shown herein. The valve disk 8 also has a conical seal surface which is complementary to the conical surface of the valve seat 7.

The trunnions 9 and 11 extend through diametrically opposed axially elongated openings 12 through the side of the valve housing and are journaled in bearings 13. The bearings are each contained within a bearing housing 14 connected to the outside surface of the valve housing in any conventional manner. The valve housings completely encircle the openings 12 in a manner to adequately seal the fluid passing through the housing 6. The bearing housings have upper and lower slides 16 and 17 provided on their inner surfaces. These slides provide a mounting surface for the bearings 13, as adequately shown particularly in FIG. 3.

A power source or servomotor 18 is rigidly connected to the side of the valve housing 6 in alignment with the bearing housing 14. A servomotor piston rod 19 extends through an opening into the interior of the bearing housings and is rigidly connected to the bearings 13. Any conventional liquid seal may be provided about the opening for the piston rod into the bearing housing.

Means are provided to open and close the valve in the form of a servomotor generally designated 21. This servomotor has a cylinder pivotally connected to the inner surface of the valve housing as at 22 best shown in FIG. 1. The free end of piston rod 23 of servomotor 21 is pivotally connected to the valve disk 8 at a point spaced from the rotational axis. In order to provide a streamlined surface for exposure to the liquid in the valve housing, the servomotor 21 is encased in a housing 24.

The operation of the butterfly valve is as follows. When the valve disk is in the closed position, shown in solid lines in FIG. 1, the servomotors 18 are activated causing the bearings 13 to slide on the rails 16 and 17 within the bearing housings. This causes the valve disk 8 to move away from the valve seat 7 to the position shown in vertical phantom lines in FIG. 1. When the valve disk has been moved away from the valve seat by the servomotors 18, it has sufficient clearance to be rotated without interfering with the valve seat. At this point the servomotor 21 is retracted, causing the valve disk 8 to rotate in a clockwise direction to the open horizontal position, also shown in phantom lines in FIG. 1.

From the above it can be seen that an uncomplicated 360° uninterrupted seating butterfly valve has been disclosed. With this arrangement the valve disk can be rotated without interference with the valve seat. Furthermore, this arrangement provides a forced seating engagement with the valve seat due to the force of the servomotors 18.

Although only one embodiment of this invention has been herein shown and described, other embodiments will be apparent after this description is read and all such embodiments as come within a reasonable interpretation of the appended claims are intended to be covered.

The embodiments of the invention in which an exclusive property or privilege is claimed are defined as follows:

1. A rotary valve comprising: a valve housing; a valve seat on the interior surface of said housing; a valve closure disk positioned within said housing for valve closing movement into engagement with said valve seat and valve opening movement out of engagement with said valve seat; shaft means connected to said disk; journal housing means connected to opposite sides of said valve housing; a shaft journal slidably contained within said journal housings including means for imparting straight line longitudinal movement to the shaft journals relative to the journal housings, said shaft means rotatably contained within said journals; first power means connected to at least one of said shaft journals for selectively and longitudinally moving said closure disk toward and away from said valve seat; and second power means for selectively rotating said closure disk.

2. The rotary valve set forth in claim 1 wherein opposite ends of said shaft means extend through diametrically opposed elongated slots through the sides of said valve housing and said journal housings are connected to said valve housing in a liquid sealing manner about said elongated slots.

3. The rotary valve set forth in claim 1 wherein said rotating means comprises a servomotor having one end pivotally connected to the interior of said valve housing and the other end pivotally connected to said valve disk at a point spaced from said shaft means.

4. The rotary valve set forth in claim 3 wherein said servomotor is positioned in a container presenting a streamlined surface to the flow of liquid through said valve.

References Cited
UNITED STATES PATENTS

| | | | |
|---|---|---|---|
| 2,833,511 | 5/1958 | Fletcher | 251—160 X |
| 2,919,885 | 1/1960 | Daigle | 251—161 |
| 3,272,223 | 9/1966 | Sass | 251—161 X |
| 3,306,571 | 2/1967 | Bussi et al. | 251—160 X |

ARNOLD ROSENTHAL, *Primary Examiner.*